(12) United States Patent
Muensterer et al.

(10) Patent No.: US 10,444,398 B2
(45) Date of Patent: Oct. 15, 2019

(54) METHOD OF PROCESSING 3D SENSOR DATA TO PROVIDE TERRAIN SEGMENTATION

(71) Applicant: Airbus Defence and Space GmbH, Ottobrunn (DE)

(72) Inventors: Thomas Muensterer, Tettnang (DE); Patrick Kramper, Kressbronn (DE)

(73) Assignee: Hensoldt Sensors GmbH, Taufkirchen (DE)

(*) Notice: Subject to any disclaimer, the term of this patent is extended or adjusted under 35 U.S.C. 154(b) by 967 days.

(21) Appl. No.: 14/595,715

(22) Filed: Jan. 13, 2015

(65) Prior Publication Data

US 2015/0198735 A1 Jul. 16, 2015

(30) Foreign Application Priority Data

Jan. 14, 2014 (EP) .................................. 14000116

(51) Int. Cl.
*G01V 3/38* (2006.01)
*G01V 3/12* (2006.01)
(Continued)

(52) U.S. Cl.
CPC .................. *G01V 3/38* (2013.01); *G01S 7/41* (2013.01); *G01S 7/4802* (2013.01); *G01S 13/89* (2013.01);
(Continued)

(58) Field of Classification Search
CPC . G01V 3/38; G01V 3/12; G01V 11/00; G01V 1/50; G01V 1/28; G01V 1/301; G01S 17/89; G01S 7/4802; G01S 13/89; G01S 7/41; G06T 7/73; G06T 2207/10028; G06T 2207/10032; G06T 2207/30212; G06T 17/05

See application file for complete search history.

(56) References Cited

U.S. PATENT DOCUMENTS 5,087,916 A * 2/1992 Metzdorff ............ G01C 21/005
342/64
5,155,706 A * 10/1992 Haley .................. G01C 21/005
367/11

(Continued)

FOREIGN PATENT DOCUMENTS

WO  WO-2009143986 A1 * 12/2009 ............. G06T 7/521
WO  WO 2011085433 A1 *  7/2011 ............. G06T 17/05
(Continued)

OTHER PUBLICATIONS

European Search Report dated Jul. 7, 2014 (Nine (9) pages).
(Continued)

*Primary Examiner* — Janet L Suglo
*Assistant Examiner* — Leonard S Liang
(74) *Attorney, Agent, or Firm* — Crowell & Moring LLP

(57) ABSTRACT

A method of processing 3D sensor data to provide terrain segmentation involves processing the 3D data so as to analyze the positions of sets returns from the terrain in the horizontal plane. Returns from an idealized flat terrain form a series of scanlines in the horizontal plane. A return having a significant displacement in the horizontal plane in comparison to other returns in the same scan line is classified as a non-ground return corresponding to an elevated object.

9 Claims, 11 Drawing Sheets

(51) Int. Cl.

| G01S 17/89 | (2006.01) |
|---|---|
| G01S 7/41 | (2006.01) |
| G01S 7/48 | (2006.01) |
| G01S 13/89 | (2006.01) |
| G06T 7/73 | (2017.01) |

(52) U.S. Cl.
CPC .............. *G01S 17/89* (2013.01); *G01V 3/12* (2013.01); *G06T 7/73* (2017.01); *G06T 2207/10028* (2013.01); *G06T 2207/10032* (2013.01); *G06T 2207/30212* (2013.01)

(56) References Cited

U.S. PATENT DOCUMENTS

| 5,339,085 | A | * | 8/1994 | Katoh | G01S 7/20 342/180 |
|---|---|---|---|---|---|
| 6,069,701 | A | * | 5/2000 | Hashimoto | G01B 11/0608 356/496 |
| 6,128,019 | A | * | 10/2000 | Crocker, III | G06T 17/05 345/419 |
| 6,157,876 | A | * | 12/2000 | Tarleton, Jr. | G01S 3/785 244/183 |
| 6,363,173 | B1 | * | 3/2002 | Stentz | E02F 9/2045 382/153 |
| 6,728,608 | B2 | * | 4/2004 | Ollis | G05D 1/024 180/169 |
| 6,750,805 | B1 | * | 6/2004 | Cameron | G01S 7/024 342/195 |
| 8,743,115 | B1 | * | 6/2014 | Mallet | G01V 1/302 345/419 |
| 2001/0018640 | A1 | * | 8/2001 | Matsunaga | G05D 1/0246 701/301 |
| 2006/0015301 | A1 | * | 1/2006 | Faulkner | G01S 7/4802 703/2 |
| 2007/0035624 | A1 | * | 2/2007 | Lubard | G01S 7/4802 348/144 |
| 2007/0280528 | A1 | * | 12/2007 | Wellington | G05D 1/0274 382/154 |
| 2008/0316089 | A1 | * | 12/2008 | Forgrieve | G01S 7/04 342/191 |
| 2009/0119010 | A1 | * | 5/2009 | Moravec | G05D 1/0251 701/533 |
| 2009/0310867 | A1 | * | 12/2009 | Matei | G06T 7/11 382/195 |
| 2010/0034422 | A1 | * | 2/2010 | James | G06T 7/246 382/103 |
| 2010/0235129 | A1 | * | 9/2010 | Sharma | G01S 7/4972 702/97 |
| 2011/0254833 | A1 | * | 10/2011 | McDaniel | G06T 17/05 345/419 |
| 2012/0038903 | A1 | * | 2/2012 | Weimer | G01C 3/08 356/4.07 |
| 2013/0166212 | A1 | * | 6/2013 | Zhandov | G01V 3/165 702/5 |
| 2013/0282208 | A1 | * | 10/2013 | Mendez-Rodriguez | G01S 17/89 701/16 |
| 2014/0049600 | A1 | * | 2/2014 | Goldner | H04N 7/18 348/36 |
| 2014/0240520 | A1 | * | 8/2014 | Liu | G06T 7/80 348/187 |

FOREIGN PATENT DOCUMENTS

| WO | WO-2011085434 | A1 | * | 7/2011 | ........... G06K 9/0063 |
|---|---|---|---|---|---|
| WO | WO-2011085435 | A1 | * | 7/2011 | ........... G06K 9/0063 |
| WO | WO-2011085436 | A1 | * | 7/2011 | ........... G06K 9/0063 |
| WO | WO-2011085437 | A1 | * | 7/2011 | ............. G06T 17/05 |

OTHER PUBLICATIONS

D. Stavens et al., "A Self-Supervised Terrain Roughness Estimator for Off-Road Autonomous Driving", Proceedings of the 22nd Conference on Uncertainty in Artificial Intelligence, MIT, Cambridge, MA, USA, 2006, (Eight (8) pages).

R. Hoffman et al., "Terrain Roughness Measurement from Elevation Maps", SPIE, vol. 1195, Mobile Robots IV, 1989 (Twelve (12) pages).

Scherer, "Low-Altitude Operation of Unmanned Rotorcraft", PhD thesis, Carnegie Mellon University, Pittsburgh, 2011 (One Hundred and Twenty-Seven (127) pages).

Park et al., "An Object Detection Algorithm for 3D Terrain Data Collected Via Laser Scanning", Proceedings of the 28th ISARC, Jun. 2011, pp. 1449-1452, XP055124573, http://www.iaarc.org/publications/fulltext/P2-17.pdf (Four (4) pages).

Tang et al., "3D Object Detection from Roadside Data Using Laser Scanners", Three-Dimensional Imaging, Interaction, and Measurement, SPIE, 1000 20th St. Bellingham WA 98225-6705, USA, vol. 7864, No. 1, Jan. 2011, pp. 1-16, XP060004503, (Sixteen (16) pages).

Anonymous: "What is lidar?", Mar. 2013, pp. 1-5, XP055124545, http://resources.arcgis.com/en/help/main/10.1/index.html#//015w00000041000000 (Five (5) pages).

Jaehyun Han et al., "Enhanced Road Boundary and Obstacle Detection Using a Downward-Looking LIDSAR Sensor," IEEE Transactions on Vehicular Technology, IEEE Service Center, Piscataway, NJ, US, vol. 61, No. 3, Mar. 1, 2012, pp. 971-985, XP011433924.

Kodagoda K.R.S. et al., "Road feature extraction using a 2D LMS," Control, Automation, Robotics and Vision, 2002. ICARCV 2002. 7th International Conference on Dec. 2-5, 2002, Piscataway, NJ, USA vol. 1 Dec. 2, 2002, pp. 453-458, XP010659802.

* cited by examiner

METHOD OF PROCESSING 3D SENSOR DATA TO PROVIDE TERRAIN SEGMENTATION

CROSS-REFERENCE TO RELATED APPLICATIONS

This application claims priority under 35 U.S.C. § 119 to European patent application 14 000 116.5, filed Jan. 14, 2014, the entire disclosure of which is herein expressly incorporated by reference.

BACKGROUND AND SUMMARY OF THE INVENTION

Exemplary embodiments of the invention relate to methods of processing 3D sensor data generated by systems such as radar or lidar systems, and to computer programs for carrying out such methods.

3D sensor data from radar, lidar and similar systems is increasingly becoming the main source of data for both manned and unmanned vehicles operating in demanding environments, particularly in degraded visual environments. Such systems are an important tool for assessing terrain in order to establish clear pathways for ground-based vehicles and landing areas for aircraft, especially vertically-landing aircraft. The segmentation of 3D sensor data gathered by such a system in order to distinguish ground returns from returns corresponding to elevated objects is typically a first processing step that is carried out immediately after basic filtering. Even in situations where measurement of terrain is not a goal in itself, processing 3D sensor data to segment ground and elevated objects is important for reasons of runtime optimization and classification stability. In the case of a manned vehicle, the processing of 3D sensor data is carried out in real time within a synthetic vision system to provide segmentation, and the results are visualized in some way to a pilot or driver. In the case of a fully autonomous vehicle, the processing of 3D sensor data replaces all evaluation tasks normally carried out by a pilot or driver, so that the speed and reliability with which the 3D data is processed to provide segmentation is of crucial importance to the overall performance of the vehicle.

In one known approach to terrain segmentation, the height value of a given return in a 3D data set is compared to those of neighboring returns and ground segmentation is carried out assuming that returns corresponding to ground areas show the most linear variation in height values. (See for example "A Self-Supervised Terrain Roughness Estimator for Off-Road Automous Driving", D. Stavens and S. Thrun, Proceedings of the 22nd Conference on Uncertainty in Artificial Intelligence, MIT, Cambridge, Mass., USA, 2006.) This approach has the disadvantage that certain terrain features, such as forest canopies, which also produce returns having a roughly linear variation in height value, may be erroneously classified as ground returns.

Other methods for ground segmentation involve plane-fitting techniques within neighborhoods of returns to determine surface roughness in 3D. A surface is fitted to a neighborhood (cell) of returns and the surface normal of the cell is determined. A ground region is identified if the surface normals of adjacent cells have a smoothness greater than a certain threshold value. Plane-fitting techniques may also result in the erroneous classification of ground regions if the height values of adjacent cells are all elevated.

More reliable ground segmentation may be achieved, but at the expense of increased computational effort. For example, Fourier analysis for the identification of spectral similarities in returns may be used in combination with plane-fitting (see for example "Terrain Roughness Measurement from Elevation Maps", R. Hoffman and E. Krotov, SPIE, Volume 1195, Mobile Robots IV, 1989.) A course-fine approach for estimating terrain slope and roughness is described by S. Scherer, in "Low-Altitude Operation of Unmanned Rotorcraft", PhD thesis, Carnegie Mellon University, Pittsburgh, 2011. Cells comprising groups of returns for which the standard deviation of height value exceeds a threshold are classified as corresponding to elevated objects.

A further disadvantage of these prior art methods is that they require a significant difference between the height value of a given return and that of a ground return in order for it to be classified as corresponding to an elevated object. For practical sensors having limited range resolution and beam divergence, sufficient height differences in the 3D data are not always achievable.

The present invention provides a method of processing 3D sensor data to provide terrain segmentation, the 3D sensor data comprising a respective coordinate set for each of a series of returns detected by a 3D sensor positioned above the terrain by scanning the 3D sensor over the terrain in a known smooth, analytical scan pattern, each coordinate set corresponding to a position vector with respect to the 3D sensor of a point in the terrain giving rise to a respective return and the coordinates defining a horizontal plane. The method comprises processing the 3D data by the steps of:
(i) identifying a series of returns having positions in the horizontal plane that would lie on a substantially smooth path or scan line in the horizontal plane in the case of returns from an idealized flat terrain and the known analytical scan pattern; and
(ii) processing the horizontal coordinates of the returns in order to identify returns having positions in the horizontal plane deviating by more than a pre-determined extent from positions of returns from a hypothetical perfect plane and classifying the deviating returns as non-ground returns corresponding to elevated objects in the terrain, thereby differentiating non-ground returns from ground returns.

By analyzing the positions of returns in the horizontal plane so as to detect deviations in those positions from the positions in the horizontal plane expected of corresponding returns from an ideal flat terrain using the known 3D sensor scan pattern, elevated objects in the terrain may be identified and segmented from ground regions in the terrain without the need for processing data corresponding to the height values of the returns. This allows for faster data processing for a given amount of processing resources, or equivalently it allows for a reduced amount of processing resources for a given amount of processing time. The prior art methods have the disadvantage that they require a high level of processing resources resulting from the need to directly process 3D sensor data in real time. In the case of a high-resolution 3D data set, it may be necessary to process more than 10,000 data points per second in a practical segmentation system. The invention takes advantage of the fact that for a known analytical scan pattern of a 3D sensor, a set of returns that will correspond to an identifiable smooth path or scan line comprising a series of consecutive positions in the horizontal plane, in the case of an idealized flat terrain, is readily identifiable a priori, whereas in prior art techniques this identification requires additional processing effort. This means that in a method of the invention the processing burden needed to provide segmentation of the 3D sensor data increases only linearly with the amount of data (i.e. the number of returns), whereas in the prior art the processing effort increases with the square of the number of returns, since each return has to be compared to every other return in the data in order to identify sets of returns corresponding to a smooth paths or scanlines in the horizontal plane.

The invention also has the advantage that objects that are smaller in size than the range-resolution of the 3D sensor may be identified, as well as objects smaller in extent than the distance between adjacent scan lines in the horizontal plane. By analyzing the positions of returns in the horizontal plane, the method is less susceptible to the erroneous classification of extended elevated areas, such a forest canopies, as ground areas in a terrain.

Preferably, the method further comprises the steps of:
(i) identifying one or more further series of returns, each series comprising returns that would lie on a respective substantially smooth path or scan line in the horizontal plane in the case of returns from an idealized flat terrain and the known analytical scan pattern,
(ii) processing the horizontal coordinates of the returns in each series to identify returns having positions in the horizontal plane that deviate by more than a pre-determined extent from the corresponding substantially smooth path or scan line, and
(iii) classifying returns found in step (ii) as non-ground returns corresponding to elevated objects in the terrain, thereby providing full terrain segmentation of the 3D sensor data.

In this way the entire 3D sensor data may be analyzed and segmented into ground areas and elevated objects (corresponding to ground and non-ground returns) by analyzing the positions in the horizontal plane of all returns corresponding to the 3D sensor data, and comparing these positions to those expected of returns from an ideal flat terrain scanned by the known analytical scan pattern.

The step of processing the horizontal coordinates of returns in a given series in order to identify returns having positions in the horizontal plane deviating by more than a pre-determined extent from the corresponding substantially smooth path or scan line is conveniently carried out by the steps of:
(i) evaluating the distances in the horizontal plane between pairs of adjacent returns in the series;
(ii) classifying a return as corresponding to a non-ground return from an elevated object in the terrain if the distance of the return from a neighboring return in the series exceeds a pre-determined threshold value.

This provides a rapid method of identifying returns corresponding to elevated objects as only in the distances in the horizontal plane between adjacent pairs of returns need be calculated.

Alternatively, the step of processing the horizontal coordinates of returns in a given series in order to identify returns having positions in the horizontal plane deviating from the corresponding substantially smooth path or scan line by more than a pre-determined extent may be carried out by the steps of:
(i) calculating an average path in the horizontal plane based on the positions of the returns in the horizontal plane, and
(ii) identifying a given return in the series as corresponding to a return from an elevated object in the terrain if its distance from the average path exceeds a pre-determined threshold value.

The step of processing the horizontal coordinates of returns in a given series in order to identify returns having positions in the horizontal plane deviating from the corresponding substantially smooth path or scan line by more than a pre-determined extent may also be carried out by the steps of:
(i) for a return under consideration, evaluating the angle in the horizontal plane between straight lines connecting the return to respective adjacent returns in the series, and
(ii) classifying said return as a return from an elevated object in the terrain if the angle is less than a pre-determined threshold value.

Preferably, for a given set of returns, the returns are considered sequentially in order of horizontal position for correspondence to a non-ground return from an elevated object, and wherein, upon detection of a non-ground return in the set, the method further comprises the steps of:
(i) identifying the next return in the set that is subsequent in horizontal position in the set to that return and which corresponds to a ground return;
(ii) for each return in the set intermediate in horizontal position between that of the non-ground return and that of the ground return identified in step (i), evaluating the distance in the horizontal plane between that return and an adjacent scanline; and
(iii) where said distance is less than a pre-determined threshold value, classifying the corresponding return as a non-ground return from an elevated object.

This ensures that in the case of an elevated object that is extended in the horizontal plane, a series of returns from the object is not erroneously classified as a series of ground returns because they have similar positions in the horizontal plane. If a non-ground return is identified, then the distances in the horizontal plane of subsequent returns are each examined for their proximities to the positions of ground returns corresponding to an adjacent scan line, and any such subsequent return is classified as corresponding to the extended elevated object if the corresponding proximity is below a pre-determined threshold value. The examination of returns subsequent to the initially identified non-ground return ceases once a subsequent ground return in the set is identified.

The method may further comprise the subsequent steps of:
(i) mapping returns classified as ground returns and non-ground returns to an array of corresponding ground and non-ground pixels, a pixel being classified as a ground pixel in the absence of a corresponding return;
(ii) identifying any ground pixel that is adjacent in the horizontal plane to a non-ground pixel;
(iii) for each pixel identified in step (ii), evaluating the difference between its height value and that of the adjacent non-ground pixel;
(iv) for each pixel identified in step (ii), evaluating the difference between its height value and that of the lowest ground pixel in the 3D data; and
(v) re-classifying a pixel identified in step (i) as a non-ground pixel if the difference found in step (iii) is less than the difference found in step (iv).

This allows for returns in the 3D data to be converted into a corresponding array of pixels each of which is classified as a ground or non-ground pixel, while providing for the re-classifying of a ground pixel as a non-ground pixel if it has a height value closer to that of a neighboring non-ground pixel than to the ground pixel having the lowest height value. This avoids the erroneous classification of a pixel as a ground pixel in the case where the pixel has initially been classified as a ground pixel due to the absence of a corresponding return from the terrain. The absence of a return from a part of the terrain may, for example, result from the absorption of some or all of the energy of a return by some obscurant between the terrain and the 3D sensor, or the mirroring-away of energy incident on a part of the terrain by the presence of water, ice etc.

The difference between the position in the horizontal plane of a ground return and a non-ground return corresponding to position vectors of the same elevation (i.e. inclination to the horizontal plane) is greater than the height at which the non-ground return is reflected, provided the viewing angle is less than 45 degrees. Therefore, the 3D data preferably corresponds to returns from the terrain corresponding to position vectors having a viewing angle which is less than 45 degrees, in order to provide increased sensitivity of detection for elevated objects.

Preferably, the 3D sensor data is pre-processed in order to remove artifacts prior to the comparison in order to reduce the likelihood of incorrect segmentation for parts of the terrain as a result of the presence of such artifacts.

Advantageously, the 3D sensor data is pre-processed to limit potential terrain measurements by taking into account only the final measured distance in the case of multiple returns from a single position in the terrain.

Further aspects of the invention provide a computer program for carrying out the method of the invention, a computer program product storing such a computer program and a computer programmed with such a computer program.

BRIEF DESCRIPTION OF THE DRAWING FIGURES

Embodiments of the invention are described below by way of example only and with reference to the accompanying drawings in which.

Figure 4:
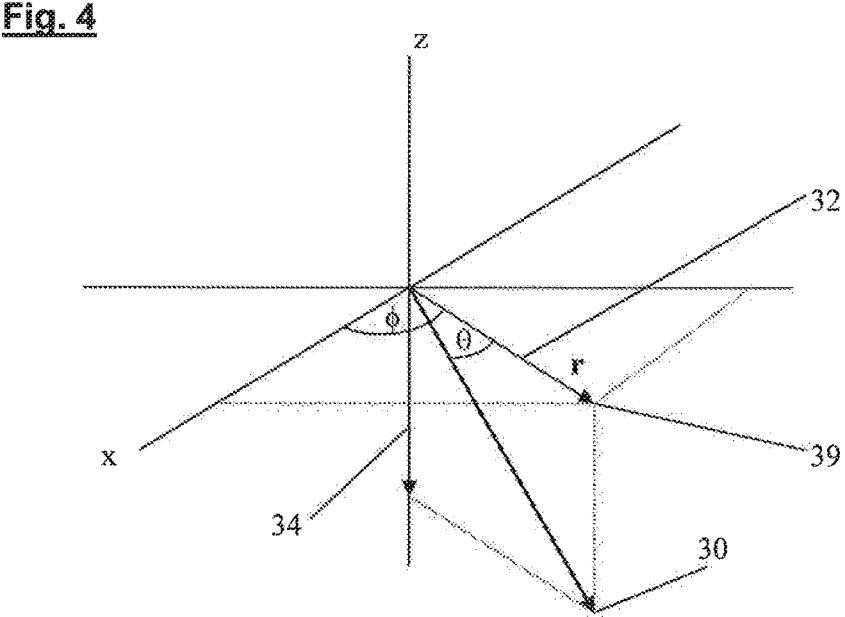
Figure 5:
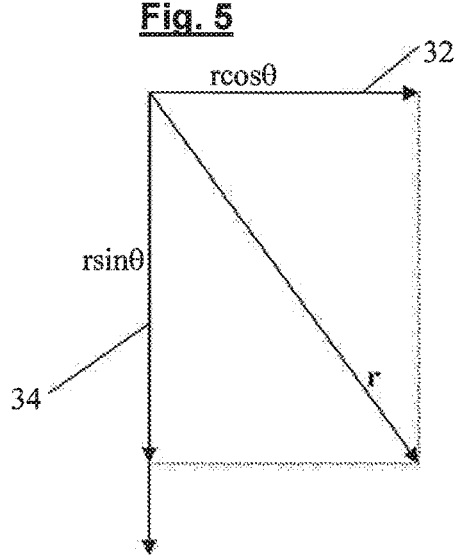
Figure 6:
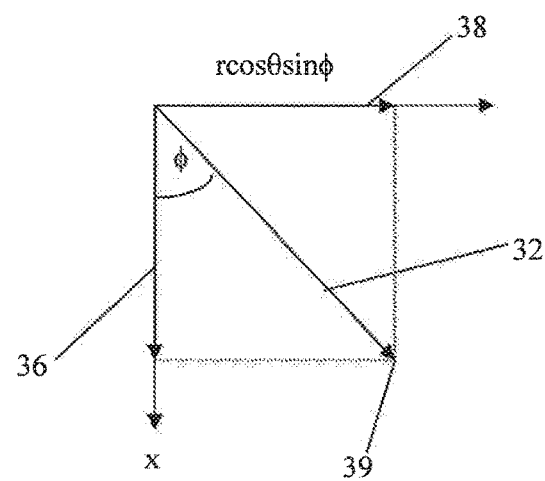
Figure 7:
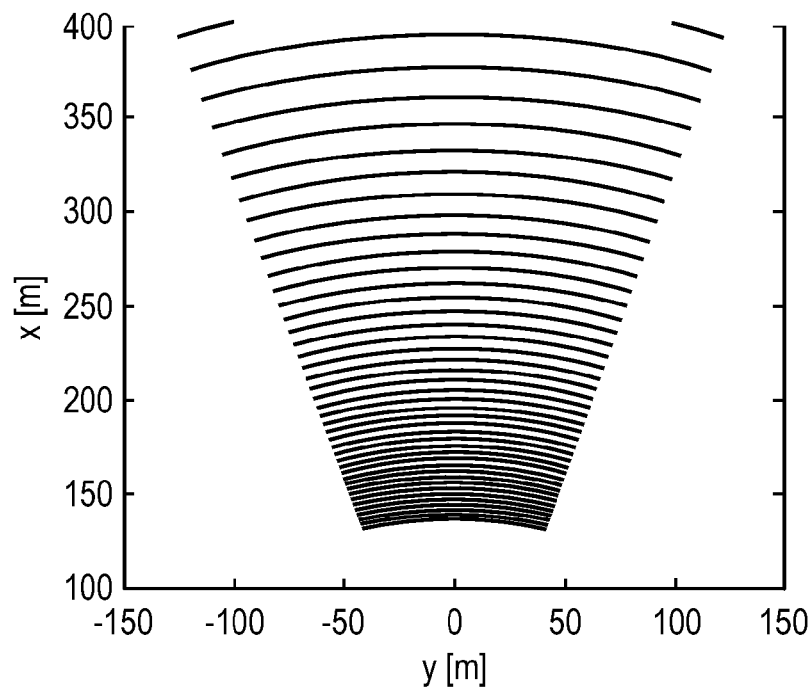
Figure 8:
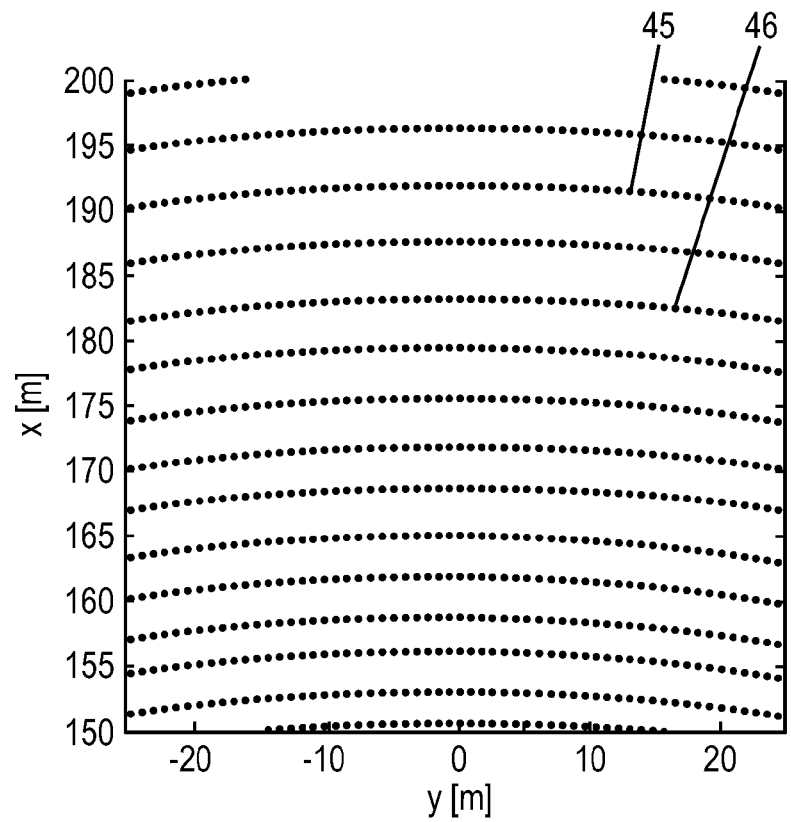
Figure 9:
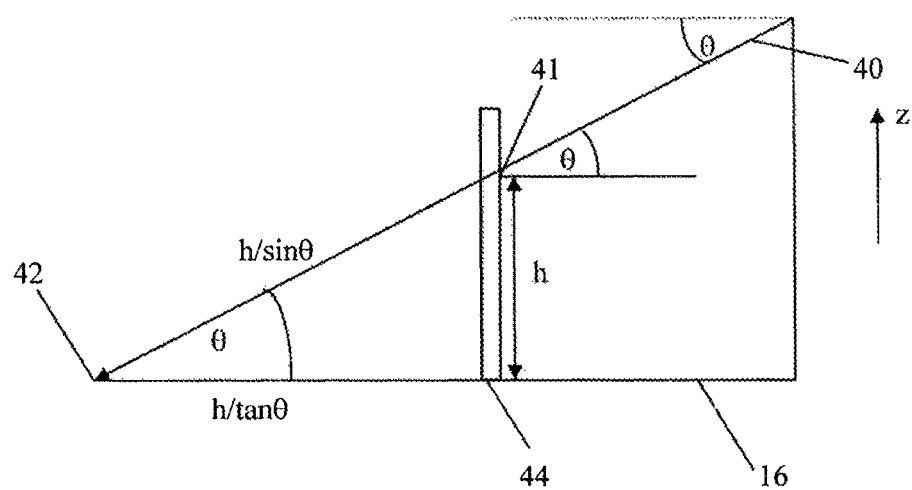
Figure 10:
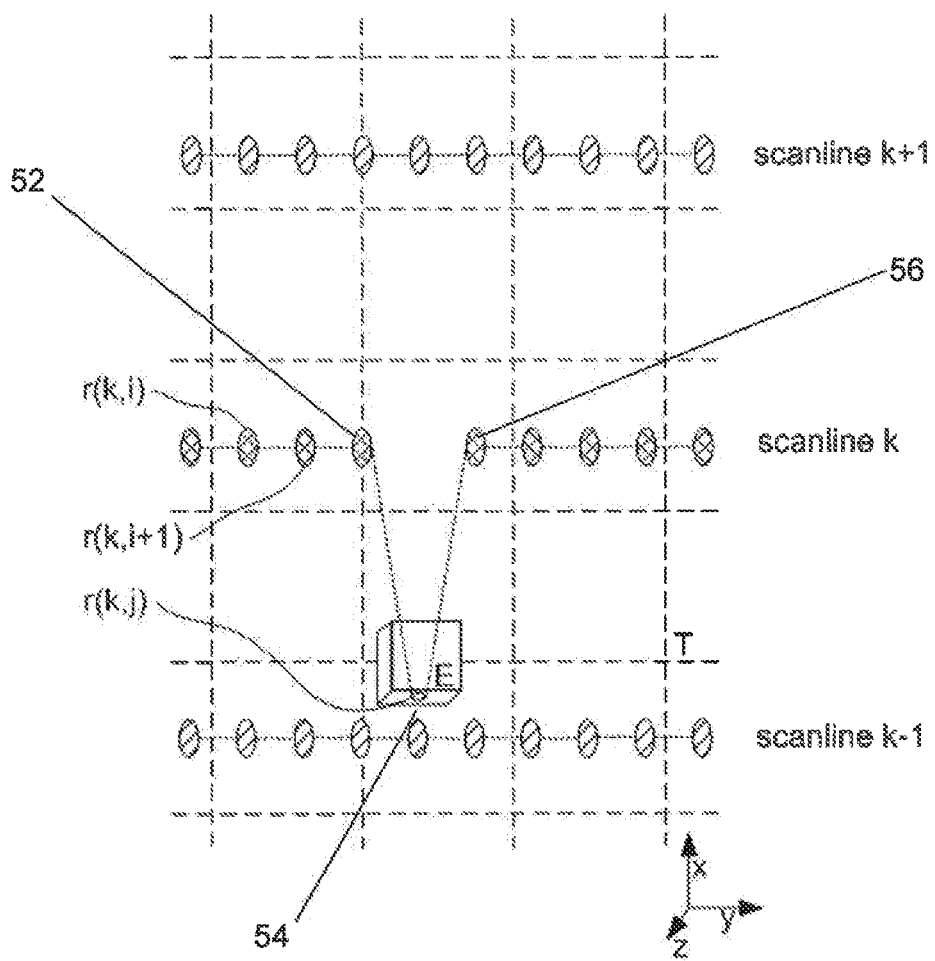
Figure 11:
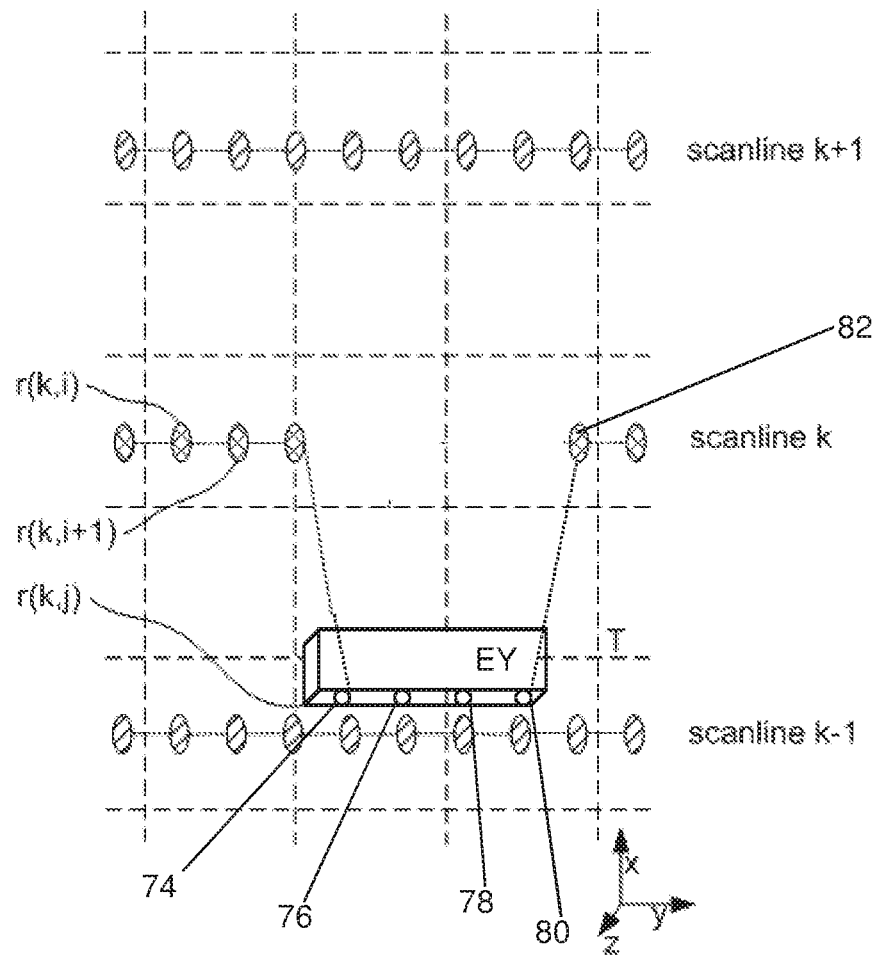
Figure 12:
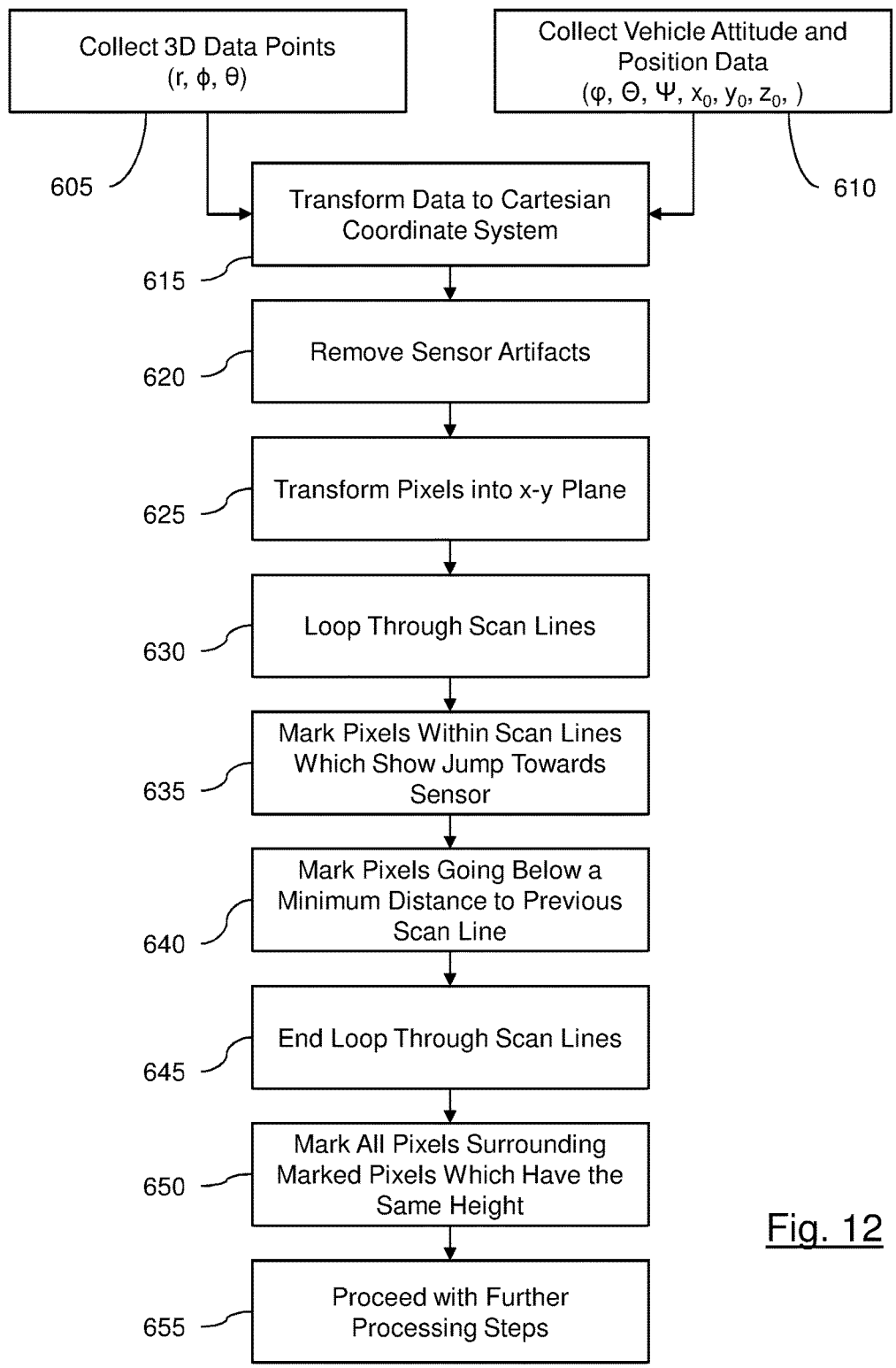
Figure 13:
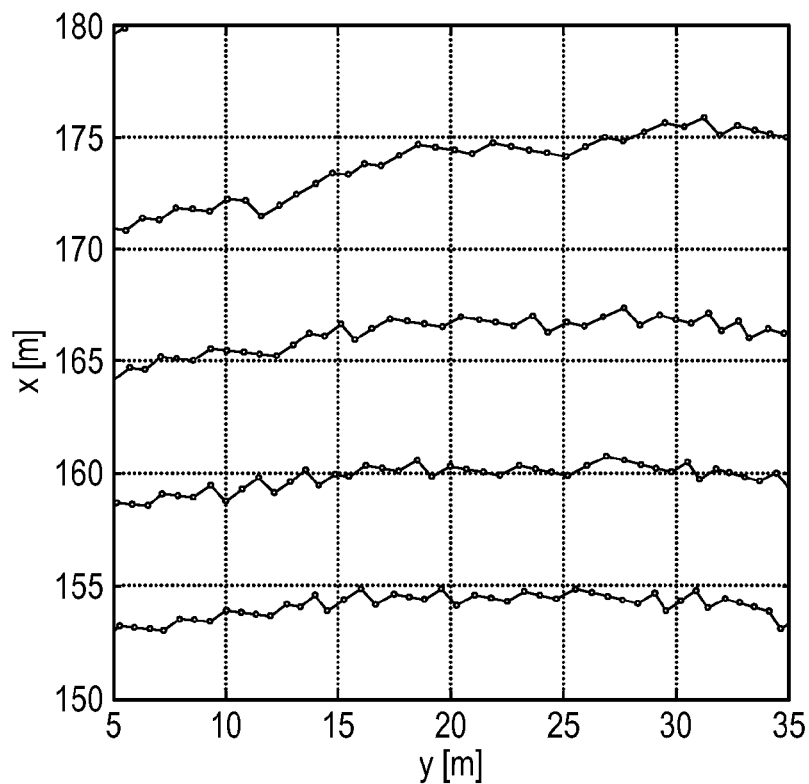
Figure 14:
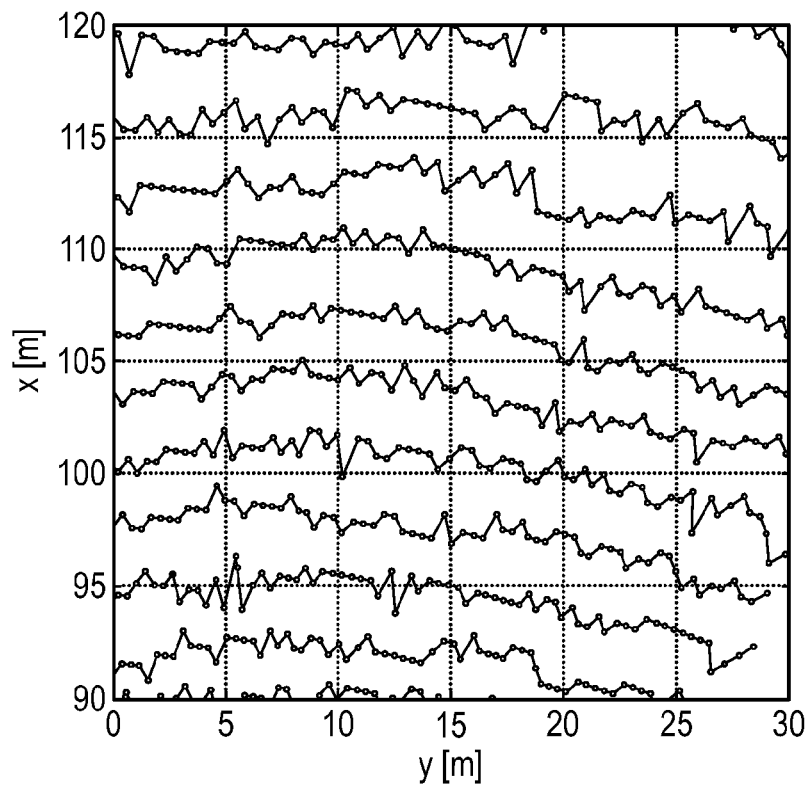
Figure 15:
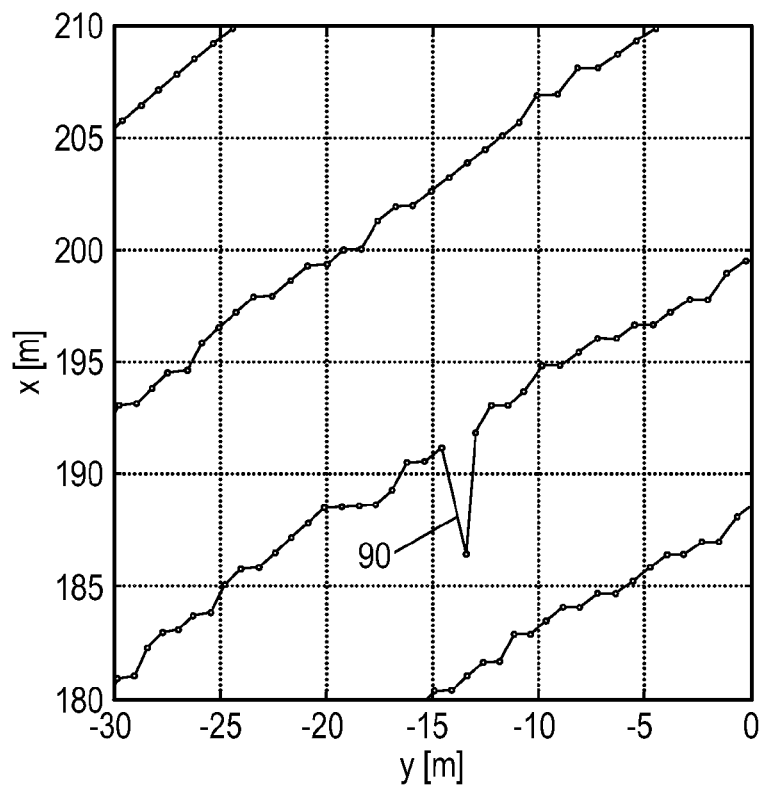
Figure 16:
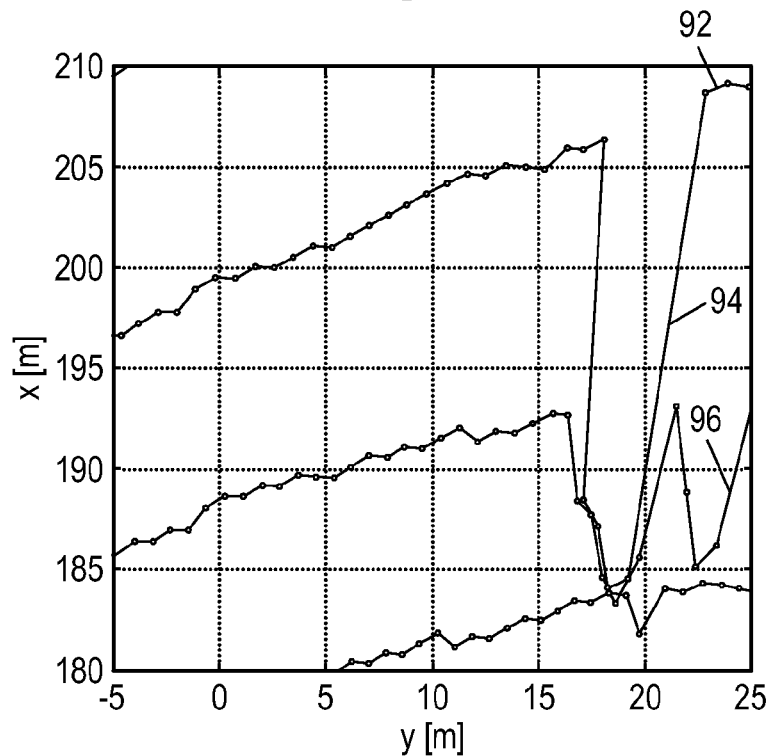
Figure 17:
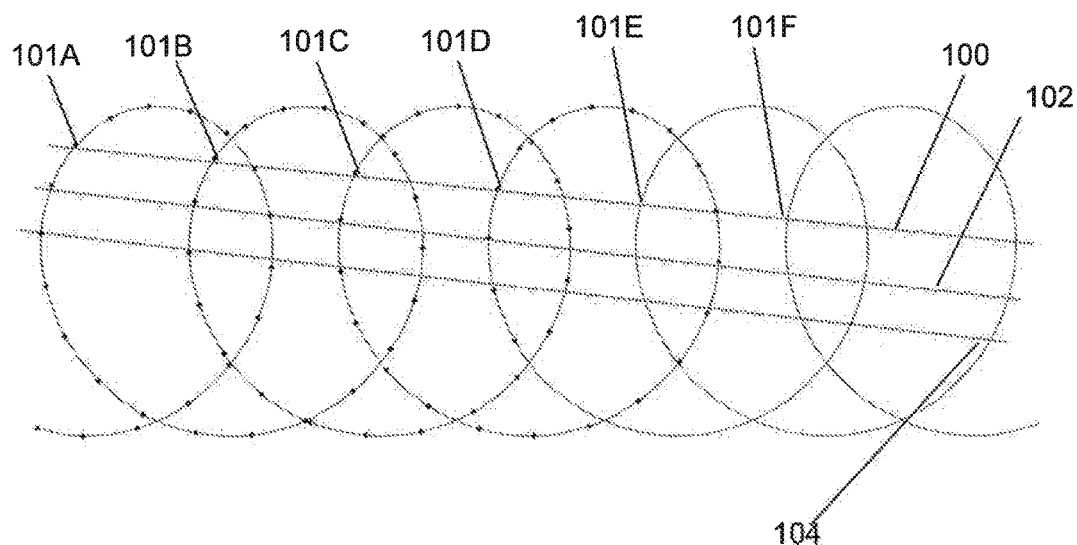
Figure 18:
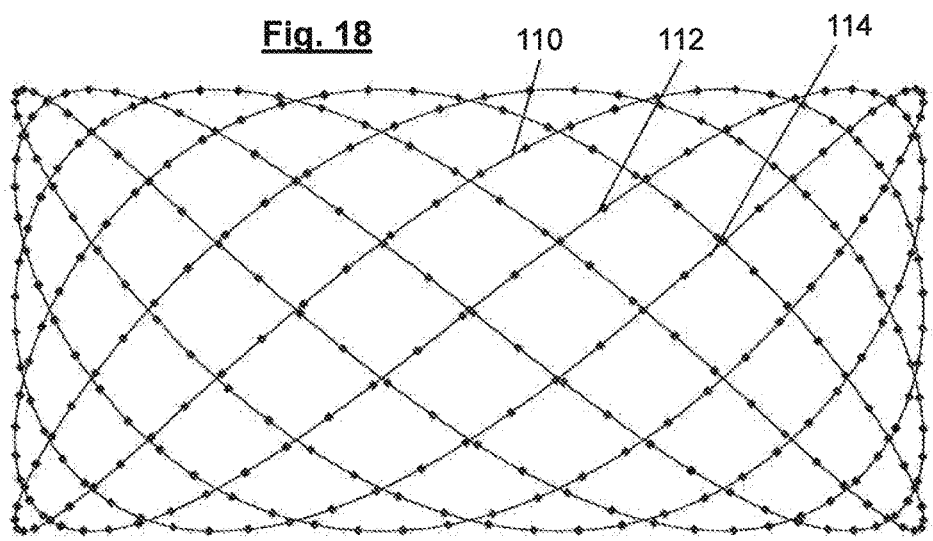

FIGS. 4, 5, and 6 show a position vector of a point in a terrain giving rise to a return, and components of the position vector;

FIGS. 7 and 8 show plots of the horizontal positions of returns from an ideal flat surface;

FIG. 9 illustrates how a position vector of a given viewing angle corresponds to a return from a point on the ground (i.e. a ground return) is modified by the presence of an elevated object;

FIG. 10 shows a plot similar to FIG. 8 in greater detail, and including the horizontal position of a return from an elevated object;

FIG. 11 is plot similar to FIG. 10, including returns from an extended elevated object;

FIG. 12 is a flow chart summarizing steps in an example method of the invention;

FIGS. 13 and 14 show plots of the horizontal positions of returns from two example real surfaces;

FIGS. 15 and 16 show a plots of the horizontal positions of returns from two example real terrains including elevated objects; and FIGS. 17 and 18 illustrate alternative scan patterns for the 3D sensor, namely a Palmer scan and a rosetta scan respectively, and how returns from corresponding positions in these scan patterns may be analyzed to detect non-ground returns from elevated objects.

DETAILED DESCRIPTION

Figure 1:
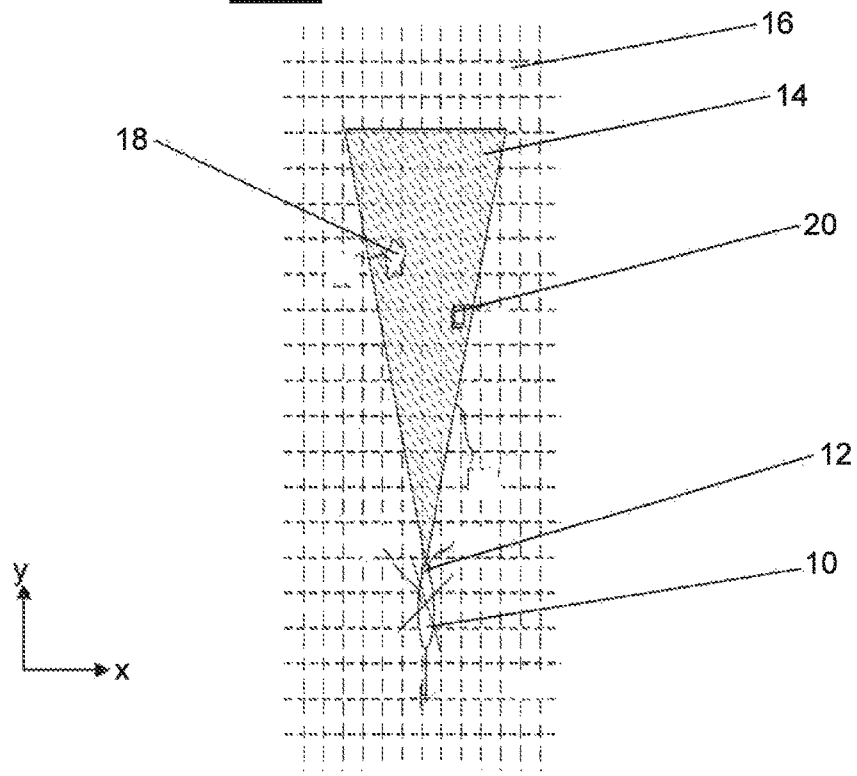
FIG. 1 illustrates how 3D sensor data corresponding to returns from a terrain may be gathered.

FIG. 1 illustrates how 3D sensor data may be gathered for processing by a method according to the present invention, and shows in plan view a helicopter 10 in an elevated position above a terrain having a ground area 16 and including elevated objects 18, 20. The helicopter 10 has a scanning radar, lidar or similar sensor 12 having a field of view 14 which includes the elevated objects 18, 20. Within the field of view 14, the sensor 12 receives a series of radar or lidar returns, any given return having associated values of range, elevation and azimuth with respect to the sensor 12, these values forming a spherical polar coordinate set (r', θ', ϕ') corresponding to a position vector from the sensor 12 to the point in the terrain giving rise to the return. Spherical polar coordinate sets corresponding to a large number of individual returns from the terrain are stored in storage means (not shown) onboard the helicopter 10 (or possibly elsewhere). In addition to recording coordinates (r', θ', ϕ') of returns from the terrain with respect to the sensor 12, the storage means also stores for each coordinate set (r', θ', ϕ') associated Cartesian position coordinates $x_0$, $y_0$, $z_0$ of the helicopter 10 (or of the sensor 12) above the terrain, and the body angles (yaw, pitch and roll) Φ, Θ, Ψ of the helicopter 10 at the time that the return corresponding to the coordinate set was received by the sensor 12.

Figure 2:
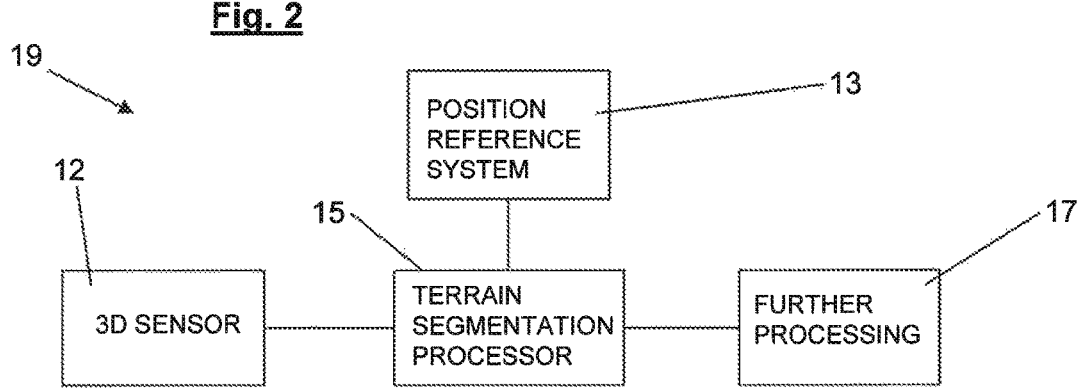
FIG. 2 is a block diagram of hardware units in an exemplary system for carrying out the invention.

FIG. 2 is a block diagram of an example hardware system 19 for carrying out the invention, comprising the 3D sensor 12, a position reference system 13, a processor for carrying out a terrain segmentation method of the invention, and a processor 17 for performing further processing, for example preparing data output from the processor 15 for visual display.

Figure 3:
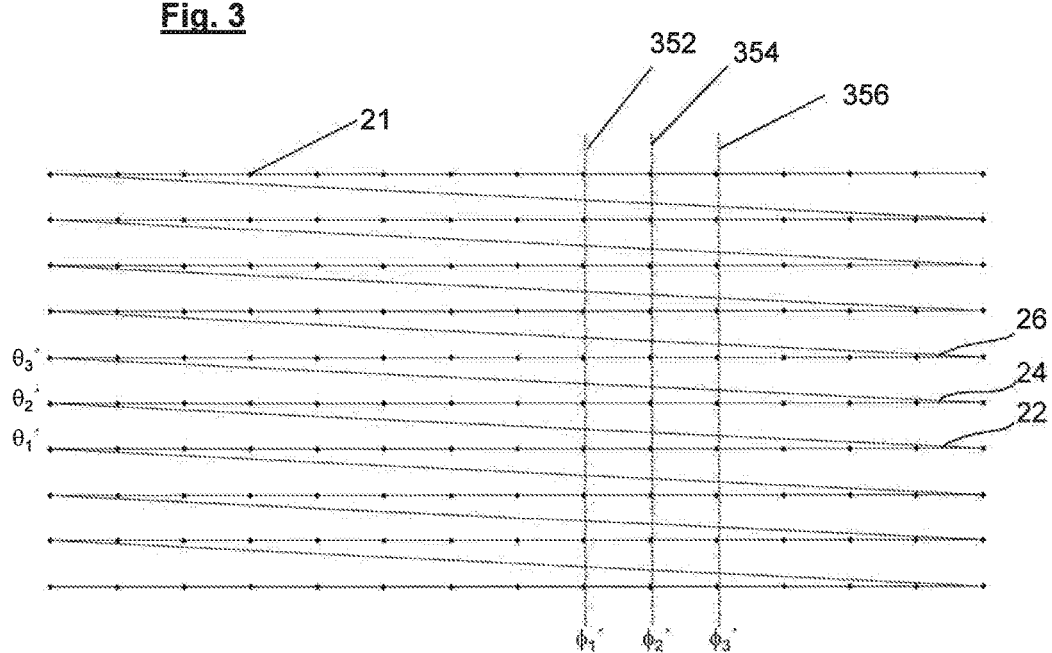
FIG. 3 illustrates a suitable scan pattern for a 3D sensor in the FIG. 2 system.

FIG. 3 shows the scan pattern of the 3D sensor 12 in a plane perpendicular to the forward direction of the 3D sensor. The 3D sensor 12 scans the area in front of the 3D sensor 12 in uniform grid pattern. It receives returns from the terrain or from obstacles at a series of positions such as 21 resulting in sets of polar coordinates $(r_{i,k}', \theta_{i,k}', \phi_{i,k}')$. Numerals 22, 24, 26 show horizontal scan lines with constant elevation angles $\theta_1'$, $\theta_2'$, $\theta_3'$. Numerals 352, 354, 356 show vertical scan lines with constant azimuth angles $\phi_1'$, $\phi_2'$, $\phi_3'$. The analysis described later is performed along the vertical or horizontal scan lines depicted here.

In a pre-processing stage, the spherical polar coordinates sets (r', θ', ϕ') of the returns from the terrain with respect to the sensor 12 are corrected (transformed) to take account of the absolute position $x_0$, $y_0$, $z_0$ of the helicopter 10 and its body angles Φ, Θ, Ψ to produce corresponding sets of corrected coordinates (r, θ, ϕ) in a coordinate system in which the xy plane is horizontal, the z direction is vertical, and the origin of the coordinates represents an absolute positional origin, e.g. in a local geo-referenced coordinate system, rather than the position of the sensor 12. The correction or transformation is applied using known mathematical and processing methods.

FIG. 4 shows a position vector r of an example point 30 in the terrain in corrected spherical polar coordinates (r, θ, ϕ), the point 30 giving rise to a return detected by the sensor 12. Referring also to FIGS. 5 and 6, the position vector r makes a viewing angle θ with the xy (horizontal) plane, and thus has a horizontal component 32 of magnitude rcos θ in the xy plane and a vertical component 34 in the negative z direction of magnitude rsin θ. The x and y components 36, 38 of the position vector r have magnitudes rcos θ cos ϕ and rcos θ sin ϕ, which respectively define the position 39 of the point 30 in the xy (horizontal) plane.

Following the pre-processing stage, the 3D sensor data thus comprises a respective corrected coordinate set (r, θ, ϕ) for each point in the terrain giving rise to a return. Each return and coordinate set corresponds to a respective position vector from the origin of the corrected coordinates to the position or point in the terrain giving rise to the corresponding return. The horizontal component of a position vector gives the position of the point in the terrain giving rise to the return in the horizontal (xy) plane. The pre-processed 3D data is subsequently filtered to remove environmental artifacts, such as noise and solar drop-ins. Because the scan pattern used to gather the 3D data is known and smooth (FIG. 3), returns corresponding to neighboring positions in the scan pattern may be readily identified.

In an advantageous embodiment of the invention, the 3D data is processed in such a way that in the case of multiple returns from the terrain at given angles $\theta'$, $\phi'$, only the last received return is considered as a potential terrain return. The other returns, which are not the last return, are considered by definition to be from elevated objects.

The principle on which the pre-processed and filtered 3D sensor data is processed in order to identify or segment elevated objects in the terrain will now be described. FIG. 7 shows plots of the xy positions of returns from an idealized flat terrain (i.e. plots of the horizontal positions of ground returns from the idealized flat terrain) when using a scan pattern of the type shown in FIG. 3, i.e. a scan pattern which when projected onto an idealized flat surface comprises concentric circular arcs, in the case where the sensor 16 or helicopter 10 has body angles $\Phi=\Theta=\Psi=0$.

Scan lines 22, 24, 26 of FIG. 3 for example each correspond to a respective circular arc on an idealized flat ground surface at viewing angles $\theta 1'$, $\theta 2'$, $\theta 3'$ respectively. When the grid pattern of FIG. 3 is directed to an idealized flat ground surface, columns of positions in the grid pattern correspond to different azimuthal positions such as $\phi_1'$, $\phi_2'$, $\phi_3'$ of a straight line connecting the 3D sensor to the ground.

FIG. 8 shows a portion of FIG. 7 in greater detail, with the xy positions of individual returns shown. Individual plots such as 45 and 46 are the loci of the xy positions of returns corresponding to neighboring points on the scan pattern, and represent smooth paths, or scan lines, indicating the loci of returns in horizontal (xy) plane.

FIG. 9 shows a position vector 40 corresponding to a return from a point 41 on an elevated object 44, the point 41 being at a height h above the ground plane 16, and the position vector 41 having a viewing angle $\theta$. In the absence of the elevated object 44, the position vector 40 would extend to a point 42 on the ground plane 16. The position vector 40 at the elevation angle $\theta$ therefore has a magnitude that is h/sin $\theta$ less than would be the case in the absence of the elevated object 44. Similarly, the horizontal component of the position vector 40 has a magnitude (i.e. length) that is h/tan $\theta$ less than would be the case in the absence of the elevated object 44. The difference h/tan $\theta$ between the magnitude of the horizontal component of a position vector having a given elevation $\theta$ corresponding to a return from an elevated object at a height h, and the magnitude of that component in the absence of the elevated object, forms the basis of detecting the presence of the elevated object and distinguishing or segmenting it from the ground 16. Equivalently, the difference in the horizontal position (i.e. position in the xy plane) of a ground return from the point 42 in the absence of the elevated object 44, and the horizontal (xy) position of a return from the point 41 on the elevated object, if it is present, may be used to detect and segment the elevated object 44. If several position vectors coming from the same scan line, i.e. having the same angle $\theta'$ and therefore having approximately the same viewing angle $\theta$ but different azimuth $\phi$ are compared on the basis of the magnitudes of their horizontal components, elevated objects in the terrain may be distinguished from ground regions by detecting significant differences in the magnitudes of the horizontal components as a function of azimuth. In other words, the positions in the xy (horizontal) plane of a series of returns corresponding to position vectors of the same elevation (scan angle) $\theta'$ but different azimuth $\phi$, may be analyzed to detect elevated objects by noting displacements in the horizontal (xy) positions of certain returns towards the position of the sensor in the xy (horizontal) plane. This is equivalent to comparing the horizontal components of position vectors having the same elevation but successive values of azimuth, and noting reductions in the lengths of the horizontal components of certain position vectors. Furthermore, since the presence of an elevated object at a height h results in a reduction h/tan $\theta$ in the magnitude of the horizontal component of a position vector of viewing angle $\theta$, compared to the case where the elevated object is absent (and the position vector corresponds to a ground return), the factor 1/tan $\theta$ is effectively a gain factor that allows more sensitive detection of elevated objects than is the case when simply comparing returns corresponding to path lengths differing by h, as is the case when returns are received from a position directly over an elevated object. Typically, the viewing angle $\theta$ used to gather a 3D data set is around 20 degrees or less, thus providing a gain factor of at least about 2.7.

FIG. 10 shows a plot similar to that of FIGS. 7 and 8, but in greater detail, and for a terrain including an elevated object E. Scanlines k−1, k and k+1 each indicate the position in the xy plane of a respective series of returns from the terrain. Each scan line corresponds to returns generated by a particular viewing angle $\theta'$ as shown in FIG. 3. Within a given scanline, adjacent positions, such as 52 and 56, represent the horizontal positions (i.e. positions in the xy plane) of returns corresponding to neighboring parts of the scan pattern. By processing 3D data so as to analyze the positions of returns in the xy plane within a given scan line, elevated objects such as E (corresponding to return 54) may be detected by detecting a discontinuity or jump in the sequence of returns within a scanline. A discontinuity or jump represents a deviation in the horizontal position of a return from the horizontal position of a corresponding return from an idealized flat surface. For example, scan line k includes three positions 52, 54, 56 in the xy plane corresponding to three returns from the terrain. The presence of an elevated object E produces a significant deviation in the scan line k, i.e. the xy position of a return 54 from the object E shows a significant displacement away from the scan line k, compared to the xy positions of the returns 52, 56, which result from adjacent positions in the scan pattern. Such deviations form the basis of detecting and segmenting elevated objects in the terrain.

In order to identify elevated objects giving rise to non-ground returns, each scan line is analyzed to identify those returns having horizontal positions deviating from those expected of returns from an idealized flat terrain. Such non-ground returns may be identified by evaluating the distances between pairs of adjacent returns in a scan line. A pre-determined threshold distance may be set, and if a given return is more than the threshold distance from any adjacent return in the scan line, that return is identified or classified as a non-ground return corresponding to an elevated object. For example, in FIG. 10 the distance of return 54 from either of adjacent returns 52, 56 is much larger than the distance between a typical pair of returns in the scan line k. The return 54 is therefore classified as a non-ground return from an elevated object in the terrain. By processing all other scan lines in a similar way, the entire 3D data set may be segmented.

Other techniques may be used to identify non-ground returns within a given scan line. For example, the horizontal positions of returns in a given scan line may be used to derive an average scan line in the xy plane, and returns deviating by more than a pre-determined threshold value from the average scan line may be classified as non-ground returns.

Another method of analyzing a return in a given scan line in order to classify the return as a ground return or a non-ground return is to evaluate the angle between straight lines joining the return to the two adjacent returns in the scan line. If the angle is less than a pre-determined threshold value, that return is classified as a non-ground return. For example, in FIG. 10, the straight lines joining return 54 to adjacent returns 52, 56 form an angle α in the horizontal (xy) plane which is less than that corresponding to a typical group of three returns elsewhere in the scan line. This allows the return 54 to be classified as corresponding to a non-ground return from the elevated object E.

FIG. 11 shows a plot similar to that of FIG. 10, in which scan line k includes returns 74, 76, 78, 80 from an elevated object EY extending in the y direction. Since the returns 74, 76, 78, 80 have substantially constant position in the x direction, returns 76 and 78 may not be classified or segmented as corresponding to an elevated object by the techniques described above with reference to FIG. 10. In order to ensure that returns such as 76 and 78 from extended objects are correctly classified as non-ground returns corresponding to an elevated object, once an initial return such as 74 has been identified as corresponding to an elevated object, the 3D data is processed such that subsequent consecutive returns 76, 78, 80 in a scan line are analyzed to evaluate their proximities to the nearest adjacent scan line, in this case scan line k−1 until a return is detected which again corresponds to a ground return, such as 82. If the distance of a subsequent return (such as 76, 78, 80) to the nearest adjacent scan line is less than a pre-determined threshold value, that return is noted as corresponding to an elevated object. In alternative embodiments of the invention, it is not necessary to assess the proximities of all subsequent returns to an adjacent scan line following detection of a return (such as 74) corresponding to an elevated object, and prior to detection of a return (such as 82) corresponding to the next ground return in the scan line. In these cases, provided the subsequent returns have an approximately constant position in the xy plane, they may be automatically classified as corresponding to an elevated object, thereby saving processing effort.

Once all the returns in the 3D data have been classified as either ground or non-ground returns, it may be desirable to map the results to a corresponding array of pixels for graphic display of the segmented data. In such cases, the absence of a return from a particular part of the terrain results in the corresponding pixel being marked by default as corresponding to a ground area. The lack of return at a given position may have a number of causes. For example, there may be no object within the detection range of the sensor at a given elevation and azimuth, as is the case for measurements above the horizon (i.e. so-called out-of-range measurements). Another possible reason for the lack of a return at a given elevation and azimuth may be the presence of an energy-absorbing or scattering obscurant located between the terrain and the 3D sensor in the corresponding direction. A third potential reason is the presence of water or snow surfaces and the like in the terrain, which cause incident energy to be largely mirrored away with only a small portion of incident energy being reflected back to the sensor. In order to avoid the erroneous designation of pixels for which there are no received returns as ground areas by default, a final operation is preferably performed that checks the local neighborhood of all segmented non-ground pixels. In this operation, the height value (i.e. z value, or r sin θ) of all pixels assessed as ground areas in the neighborhood of a segmented non-ground pixel, as defined by the scan pattern, are checked, and those having a height value closer to that of the highest ground pixel than to that of the lowest non-ground pixel in the neighborhood are re-classified as ground pixels.

FIG. 12 shows a flow diagram of the example method of the invention described above with reference to FIGS. 1 to 11. In an initial step (605) sets of coordinates each corresponding to a return from a terrain are gathered by a 3D sensor that scans the terrain in a known analytical scan pattern. These coordinates are relative to the sensor. For each return, coordinates $x_0$, $y_0$, $z_0$ corresponding to the absolute position of the sensor 12 with respect to the terrain, together with the body angles (yaw, pitch and roll) Φ, Θ, Ψ of the sensor are recorded (610), and used to transform the data gathered in step 605 into a corrected coordinate system (615) defining a true horizontal plane and a true vertical, i.e. to transform or correct the data gathered in step 605. In a pre-processing stage, artifacts in the corrected data are removed (620) if required. Individual returns are then analyzed by analyzing the positions of the returns in the xy (horizontal) plane, a given set of returns corresponding to consecutive adjacent returns in a particular scanline in the xy plane (625). As the individual scanlines are analyzed (630), returns showing a significant deviation from a scan line (i.e. those having a significantly reduced xy coordinate values) are marked as corresponding to an elevated object (635). When a deviation is detected, the distances in the xy plane of subsequent returns (i.e. returns subsequent in the scan line) from an adjacent scan line are measured until a return corresponding to another ground return is identified. If the distance of the subsequent returns from the adjacent scan line is below a pre-determined threshold value, then these returns are also classified as corresponding to an elevated object (640). The remaining scan lines are similarly processed (645) in order to segment the entire 3D data. Where the classified returns are mapped to pixels for graphic display for example, a check is made on those pixels, marked as corresponding to ground areas, which are in the neighborhood of pixels marked as corresponding to an elevated object (650). In this check, the height value of a pixel marked as corresponding to ground area is compared to that of the pixel identified as corresponding to an elevated object. If the height value of the pixel is closer to that of the pixel corresponding to the elevated object than to that of the pixel corresponding to the lowest ground return, then that pixel is re-classified as corresponding to an elevated object. In further steps (655), the fully segmented 3D data may be manipulated or processed for display, for example to a pilot.

FIGS. 13 and 14 show real examples of scan lines for a concrete surface and a grassy surface, respectively. The positions of returns in the xy plane are sufficiently distinctive to allow classification of ground surfaces on the basis of roughness, in additional to the identification of elevated, non-ground, objects. This is another important advantage of the invention. Classification of ground area on the basis of roughness may, for example, be carried out by analyzing the smoothness, or otherwise, of individual scan lines. For example, a sliding average of the maximum displacement of a certain length of a scan line may be calculated; this value will be higher for rougher surfaces than for smooth ones.

FIG. 15 shows a real example of a set of scan lines, one of which includes a return 90 from a small box lying on the ground. A method of the invention is particularly effective at segmenting small objects. Typically, such small objects cannot be separated from the ground using the height value of a return because this represents a single measurement within the height distribution of the ground. Noise within the height distribution is caused by factors such as divergence in the measurement beam of the sensor, inaccuracies in navigation devices and by the limited distance accuracy of sensors, particularly those used for long-range measurements. The detection of displacements in the horizontal (xy) plane according to the present invention may also be combined with analysis of statistical properties of returns, as described in published European Patent Application 2 418 510, to provide further reliability in the detection of small objects on the ground.

FIG. 16 shows three scan lines obtained from another example terrain. A large elevated object is responsible for producing a large deviation 94 in the scan line 92, the deviation 94 including several returns from the object. FIG. 16 also illustrates another advantage of the invention, namely the identification and segmentation of parts of elevated objects that overhang terrain in front of the objects. This is very beneficial because it serves as a pre-processing step to distinguish, for example, suspended wires or hovering clouds from objects having a connection to the ground. Overhanging parts typically show an intersection or crossover of a deviation such as 94 with a previous scan line, such as 96.

A further advantage of the invention is that it may also be carried out using data gathered by a scanning 3D sensor that does not have a homogeneous scan pattern. (A 3D matrix pattern such as that shown in FIG. 3 is a homogenous pattern. Several commercially available scanning sensors provide a homogenous scan pattern, for example scanning ladars with raster scans, as well as flash ladars.) For example, sensors having so-called Palmer scans or rosetta scans may be used to gather the 3D data. Such scan patterns are globally inhomogeneous but are homogenous along a given scan. In these cases the data processing steps must be modified to correspond to the different scanning principle. Such a scan is not linear horizontally or vertically, nevertheless parts of the scan may be considered to be linear. It may also be possible to consider each sweep of the scanner through the field of view as one scan, as reversal points of such sweeps are typically outside the field of view. For globally inhomogeneous scan patterns alternative processing is needed to evaluate scan smoothness, compared to the processing need for a raster scan for example. One possibility is to evaluate the change in distance between adjacent returns in a scan. For ideal flat terrain, the range value of a return, as well as its position in the xy plane, should homogeneously increase or decrease along a scan. A return from an elevated object will produce a discontinuity in range as well as in xy position when compared to a ground return. Although scans such as a Palmer scan appear complicated due to global inhomogeneity, nevertheless the correspondence of certain parts of scan to neighboring scan lines is deterministic.

FIG. 17 shows the path of a Palmer scan and points on the path at which data is received by a scanning sensor executing the scan in a plane perpendicular to the forward direction of the 3D sensor. Groups of corresponding positions as 101A-F may be analyzed along a pseudo-scan lines 100 to detect deviations in the positions of returns within this pseudo-scan line, thus identifying non-ground returns corresponding to elevated objects in a terrain. Further, such pseudo-scan lines, such as 102, 104 may be similarly analyzed to segment all the data in a 3D data set gathered by the sensor.

FIG. 18 shows the path of another example scan pattern for a 3D sensor, namely a rosetta scan pattern in a plane perpendicular to the forward direction of the 3D sensor. Returns from portions of the scan pattern such as 110, 112, 114 may be processed as individual scan lines, and elevated objects detected by noting deviations in the positions of returns received from an actual terrain away from the scan lines in the xy (horizontal) plane.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of processing 3D sensor data associated with a terrain to provide terrain segmentation, the method comprising:

generating, by a 3D sensor, the 3D sensor data, wherein the 3D sensor data comprises a respective coordinate set for each of a series of returns detected by a 3D sensor positioned above the terrain by scanning the 3D sensor over the terrain in a known smooth, analytical scan pattern, each coordinate set corresponding to a position vector with respect to the 3D sensor of a point in the terrain giving rise to a respective return and the coordinates defining a horizontal plane;

identifying a series of returns having positions in the horizontal plane that would lie on a substantially smooth path or scan line in the horizontal plane for returns from a flat terrain and the known analytical scan pattern; and processing the horizontal coordinates of the returns in order to identify returns having positions in the horizontal plane deviating by more than a pre-determined extent from positions of returns from a hypothetical plane;

classifying the deviating returns as non-ground returns corresponding to elevated objects in the terrain;

differentiating non-ground returns from ground returns using the classification of deviating returns;

identifying one or more further series of returns, each further series comprising further returns that would lie on a respective substantially smooth path or scan line in the horizontal plane for returns from a flat terrain and the known analytical scan pattern;

processing horizontal coordinates of the further returns in each further series to identify further returns having positions in the horizontal plane deviating by more than a pre-determined extent from the corresponding substantially smooth path or scan line; and classifying the deviating further returns as non-ground returns corresponding to elevated objects in the terrain;

providing full terrain segmentation of the 3D sensor data using the classification of the deviating further returns to establish clear pathways for a vehicle; and enabling displaying, by further processing, of the terrain segmentation to a pilot or driver of said vehicle, wherein for a given set of returns, the returns are considered sequentially in order of horizontal position for correspondence to a non-ground return corresponding to an elevated object, and wherein, upon detection of a non-ground return in the set, the method further comprises the steps of:

(i) identifying a next return in the set that is subsequent in horizontal position in the set to the non-ground return and which corresponds to a ground return;

(ii) for each return in the set intermediate in horizontal position between that of the non-ground return and that of the ground return identified in step (i), evaluating the distance in the horizontal plane between that return and an adjacent scan line; and (iii) when the distance is less than a pre-determined threshold value, classifying the corresponding return as a non-ground return from an elevated object.

2. The method of claim 1, wherein the step of processing the horizontal coordinates of returns in a given series in order to identify returns having positions in the horizontal plane deviating by more than a pre-determined extent from the corresponding substantially smooth path or scan line is carried out by the steps of:

evaluating the distances in the horizontal plane between pairs of adjacent returns in the series; and classifying a return as corresponding to a non-ground return from an elevated object in the terrain when the distance of the return from a neighbouring return in the series exceeds a pre-determined threshold value.

3. The method of claim 1, wherein the step of processing the horizontal coordinates of returns in a given series in order to identify returns having positions in the horizontal plane deviating from the corresponding substantially smooth path or scan line by more than a pre-determined extent is carried out by the steps of:

calculating an average path in the horizontal plane based on the positions of the returns in the horizontal plane; and identifying a given return in the series as corresponding to a return from an elevated object in the terrain if its distance from the average path exceeds a pre-determined threshold value.

4. The method of claim 1, wherein the step of processing the horizontal coordinates of returns in a given series in order to identify returns having positions in the horizontal plane deviating from the corresponding smooth path or scan line by more than a pre-determined extent is carried out by the steps of:

for a return under consideration, evaluating the angle in the horizontal plane between straight lines connecting the return to respective adjacent returns in the series; and classifying the return as a return from an elevated object in the terrain when the angle is less than a pre-determined threshold value.

5. The method of claim 1, further comprising the steps of:

(i) mapping returns classified as ground returns and non-ground returns to an array of corresponding ground and non-ground pixels, a pixel being classified as a ground pixel in absence of a corresponding return;

(ii) identifying any ground pixel that is adjacent in the horizontal plane to a non-ground pixel;

(iii) for each pixel identified in step (ii), evaluating the difference between its height value and that of the adjacent non-ground pixel;

(iv) for each pixel identified in step (ii), evaluating the difference between its height value and that of the lowest ground pixel in the 3D data; and (v) re-classifying a pixel identified in step (i) as a non-ground pixel if the difference found in step (iii) is less than the difference found in step (iv).

6. The method of claim 1, wherein for each return in the 3D data set, a corresponding position vector makes an angle with the horizontal plane of less than 45 degrees.

7. The method of claim 1, wherein the 3D sensor data is pre-processed to eliminate noise resulting from artifacts caused by the 3D sensor or environmental artifacts.

8. The method of claim 1, wherein the 3D sensor data is pre-processed to limit potential terrain measurements by taking into account only the final measured distance in the case of multiple returns from a single angular position with respect to the 3D sensor.

9. A non-transitory computer-readable medium comprising program instructions, which when executed by a computer cause the computer to:

generate, using a 3D sensor, 3D sensor data associated with a terrain, wherein the 3D sensor data comprises a respective coordinate set for each of a series of returns detected by a 3D sensor positioned above the terrain by scanning the 3D sensor over the terrain in a known smooth, analytical scan pattern, each coordinate set corresponding to a position vector with respect to the 3D sensor of a point in the terrain giving rise to a respective return and the coordinates defining a horizontal plane;

identify a series of returns having positions in the horizontal plane that would lie on a substantially smooth path or scan line in the horizontal plane for returns from a flat terrain and the known analytical scan pattern; and process the horizontal coordinates of the returns in order to identify returns having positions in the horizontal plane deviating by more than a pre-determined extent from positions of returns from a hypothetical plane;

classify the deviating returns as non-ground returns corresponding to elevated objects in the terrain;

differentiate non-ground returns from ground returns using the classification of deviating returns;

identify one or more further series of returns, each further series comprising further returns that would lie on a respective substantially smooth path or scan line in the horizontal plane for returns from a flat terrain and the known analytical scan pattern;

process horizontal coordinates of the further returns in each further series to identify further returns having positions in the horizontal plane deviating by more than a pre-determined extent from the corresponding substantially smooth path or scan line; and classify the deviating further returns as non-ground returns corresponding to elevated objects in the terrain; and provide full terrain segmentation of the 3D sensor data using the classification of the deviating further returns to establish clear pathways for a vehicle; and enabling displaying, by further processing, of the terrain segmentation to a pilot or driver of said vehicle, wherein for a given set of returns, the returns are considered sequentially in order of horizontal position for correspondence to a non-ground return corresponding to an elevated object, and wherein, upon detection of a non-ground return in the set, the program instructions when executed by a computer further cause the computer to:

(i) identify a next return in the set that is subsequent in horizontal position in the set to the non-ground return and which corresponds to a ground return;
(ii) for each return in the set intermediate in horizontal position between that of the non-ground return and that of the ground return identified in step (i), evaluate the distance in the horizontal plane between that return and an adjacent scan line; and
(iii) when the distance is less than a pre-determined threshold value, classify the corresponding return as a non-ground return from an elevated object.

* * * * *